Figure 1:
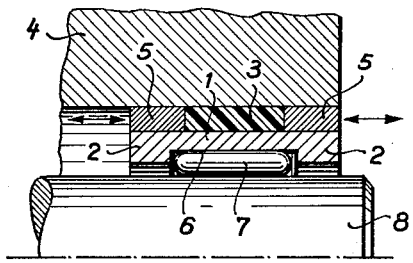

Sept. 11, 1962   E. BENSCH ETAL   3,053,591
ADJUSTABLE CLEARANCE ANTIFRICTION BEARING
Filed Aug. 11, 1958   2 Sheets-Sheet 1

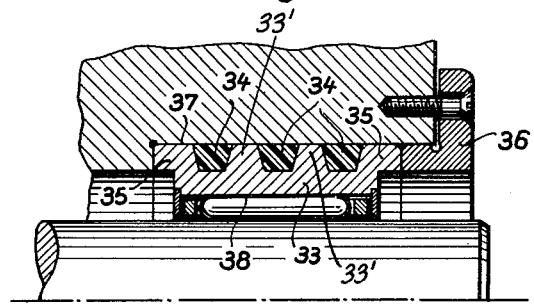
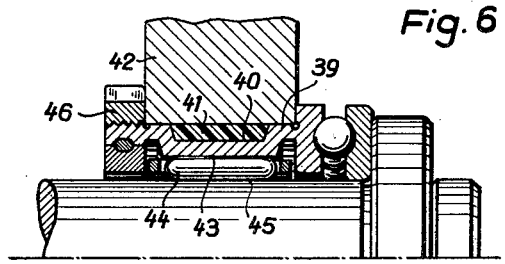
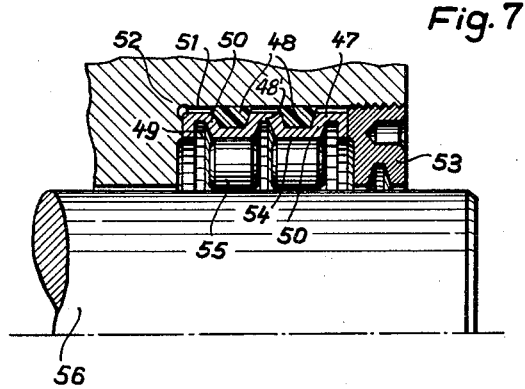

United States Patent Office 3,053,591
Patented Sept. 11, 1962

3,053,591
ADJUSTABLE CLEARANCE ANTIFRICTION BEARING
Emil Bensch, Herzogenaurach, and Andreas Brugger, Munich, Germany, assignors to Industriewerk Schaeffler oHG, Herzogenaurach, Germany, a German company
Filed Aug. 11, 1958, Ser. No. 754,312
Claims priority, application Germany Aug. 16, 1957
10 Claims. (Cl. 308—207)

This invention relates to adjustable-clearance antifriction bearings.

Owing to the accuracy attainable in manufacture and to the tolerances which have to be combined with one another when assembling antifriction bearings, many precision bearings are provided with too much radial clearance. There has therefore been a continual attempt to enable the clearance to be adjustable as far as possible even during operation. Adjustable-clearance antifriction bearings, particularly bearings having cylindrical roller elements, are predominantly assembled by means of conical bores in the inner race, which is expanded by means of conical sleeves. This construction requires very great accuracy in the cones which correspond to one another, and this accuracy can only be achieved with considerable outlay and expense.

A further method has been to achieve adjustability of bearing clearance by means of spring bands which themselves are inserted as a race between a cylindrical surface and the roller elements or between a conical surface and the roller elements, and which achieve a radial constriction of the clearance in dependence on the extent to which they are compressed axially.

Also known are slit races which are inserted in a conical sleeve and whose diameter can be varied by axial displacement.

In recent times, adjustable-clearance needle bearings or roller bearings have been produced by constructing at least one race as an elastic element and so shaping it as to form outer and inner shoulders which form articulation points.

More especially with races which are specially profiled or are tensioned by springs, the raceway is given additional elasticity which under high loads makes the bearing insufficiently rigid or produces noise owing to resonance at high speeds of rotation.

According to the present invention there is provided an adjustable-clearance antifriction bearing comprising an annular race, a raceway at one side of the race annulus, a race seating at the other side of the race annulus, a ring of deformable material between the race and the race seating, and parts for axially holding the ring between the race and the seating, said ring being maintained under compression to adjust the diameter of the raceway and the bearing clearance.

The deformable ring can be of multi-part construction in the axial direction or also in the peripheral direction. If the deformable ring is of multi-part construction in the axial direction, particularly advantageous compression conditions are obtained, whereas multi-part construction of the deformable ring in the peripheral direction is more particularly advantageous when the deformable ring has to be inserted in recesses in the race.

The deformable material of the ring can also be elastic, so that, when compression on the ring is reduced, the radial variation in volume of the ring can be annulled and therefore the bearing clearance varied. The use of elastic material for the deformable ring makes it possible to allow the bearing clearance to be adapted to varying working conditions, e.g. different rotational speeds.

It is also possible to insert the deformable ring or rings in one or more recesses in the race.

Furthermore, the race provided with one or more recesses for accommodating deformable rings can also be provided at radially opposite sides with recesses which are offset with respect to the other recesses. By this arrangement the race is formed with bent-over portions which make the surfaces bounding the deformable ring approach one another in the axial sense.

Figure 2:
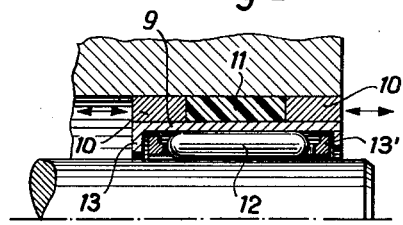

For a better understanding of the invention and to show how the same may be carried into effect, reference will now be made to the accompanying drawings in which:

FIGURE 1 is a longitudinal sectional view of a needle bearing having a deformable ring about the outer race wall between two thrust washers, the assembly being built into a bearing housing, FIGURE 2 is a longitudinal sectional view of a needle bearing with a thin-walled race according to FIGURE 1, built into a housing.

Figure 3:
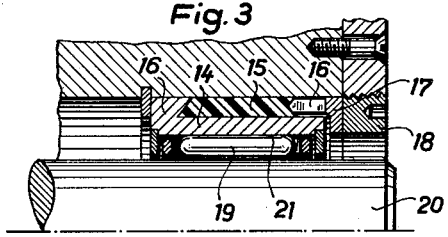
Figure 4:
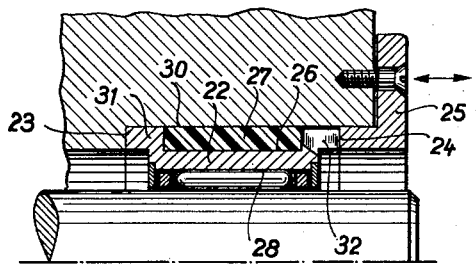

FIGURE 3 is a longitudinal sectional view of a needle bearing with a groove recessed in the race wall and means for axially compressing the inserted ring, FIGURE 4 is a longitudinal sectional view of a needle bearing in a somewhat modified form of embodiment, with a recessed groove in the race wall and axial compression means for the inserted ring, FIGURE 5 is a longitudinal sectional view of a needle bearing having a plurality of recessed grooves and axial compression means for the race, FIGURE 6 is a longitudinal sectional view of a combined needle and ball bearing having a specially profiled race cross-section and an inserted ring, and FIGURE 7 is a longitudinal sectional view of a cylindrical roller bearing having a shaped elastic race and rings inserted in the outer grooves.

In FIGURE 1, 1 is a needle bearing race which has fixed rims 2, is surrounded by an elastically deformable ring 3 and is inserted in a housing or seating 4. The elastic ring 3 is bounded in the axial sense by annular elements or thrust rims, washers or rings 5 which, as indicated by the arrows, are so displaceable in the axial direction as to cause compression of the elastic ring 3, which acts on the central portion of the race 1. The radial component of this compression narrows the raceway diameter 6 so that the clearance between the needles 7 and the shaft 8 and raceway 6 is reduced.

In FIGURE 2, the race of a needle bearing is constructed as a thin-walled sleeve 9. In a similar fashion to FIGURE 1, the axial compression of two annular elements, ring or rims 10 causes a deformable ring 11 arranged about the race wall to be compressed so that its radial component narrows the clearance of the bearing needles 12. The ends of the raceway are here stiffened by rims 13 and 13′, just as in FIGURE 1 the ends are stiffened by the rims 2, so that the radial pressure of the elastic ring 11 produces a cambered raceway for the needles.

In FIGURE 3, the race 14 of a needle bearing is provided with a groove in which is inserted a deformable ring 15 which is a divided metal ring or an undivided plastic ring applied by extrusion. The integral annular element or rim 16 forming the axial boundary of the deformable ring 15 is interrupted in the manner of a toothed rim, so that an adjusting nut 18 can be used to exert adjustable axial pressure on the ring 15 by means of a separate ring or annular element 17 provided with pins. The axial compression of the ring 15 results in the constriction of the radial clearance between the bearing needles 19 and the shaft 20 and raceway 21, as described already hereinbefore.

In FIGURE 4, the needle race 22 is so constructed that the collars holding the deformable ring 27 in the axial direction compress the deformable ring by axial pressure. Axial pressure on the end faces 23 and 24 by means of a flange 25 which can be adjusted by screws exerts axial compression on the ring 27 situated in a recess 26, resulting in mechanical bending of the raceway 28. The compression of the ring 27 is further promoted by mechanical bending caused by deformation of the race. Owing to the special construction of the annular integral lateral rims or rings 31 and 32 of the race, which rims can be slit at several points on the circumference thereof as shown for example at the lateral rim 32, the axial loading increases the diameter of the lateral rims 31 and 32 which thus come to bear fast against the bore 30 of a housing, thus insuring accurate centering of the race 22 of the needle bearing in the housing bore 30.

The constructional form of FIGURE 5 differs from that of FIGURE 4 merely in that there are provided in the outer wall of a race 33 a plurality of grooves with deformable rings 34 inserted therein and with integral annular elements 33' remaining on the race 33 and contacting the adjacent side walls of said deformable rings 34. The annular integral lateral rims or rings 35 are in this case not slit, but are constructed with such a small cross-section that when axial compressive force acts thereon from a flange 36 which is adjustable by screws, said rims bear against the bore of a housing 37 and center the raceway 38 relatively to the housing 37. The axial compression at the same time deforms the inserted rings 34.

The use of an elastically deformable ring in the recess of a specially profiled race of a needle bearing or other antifriction bearing also makes it possible to have an arrangement such as is shown in FIGURE 6. The shaped race 39 of a combined needle and ball bearing, which is provided with a recess 40 in which an elastically deformable ring 41 is inserted, is introduced with such pressure into a housing 42 that, after fitting, a cambered raceway 43 is provided, with the smallest possible clearance between the bearing needles 44 and the surface 45 of a shaft and the raceway 43. By axial tensile forces which are exerted on the race by a ring or rim in the form of an annular nut 46, the camber of the raceway 43 can be reduced and the clearance increased.

The use of a per se known race for an adjustable-clearance needle or roller bearing, the race being constructed as an elastic element, is illustrated by FIGURE 7. A shaped race 47 comprises outer recesses 48 on opposite sides of an annular rib 48' and inner recesses 49, thus forming a plurality of bent-over portions 50 which are situated approximately perpendicularly to the axis of the bearing constituting annular rings or rims and acting in the manner of cup springs. The shaped race 47 is illustrated in the non-tensioned condition. A small clearance for fitting is provided between the housing wall 51 and the outer race wall 52.

Expediently the elastically deformable rings inserted in the outer recesses 48 of the race are produced ab initio with a relatively large cylindrical wall surface diameter, which produces a slight pressure in the housing bore. By axial adjustment of a threaded nut 53, the shaped race 47 is so deformed that its outer diameter at both ends and in the middle is increased and comes to bear against the bore 51 of the housing, whereas the diameter of the raceway 54 is reduced and provides a reduced clearance for rollers 55 between a shaft 56 and raceway 54. With axial compression of the profiled race, the recesses 48 are constricted, and the inserted elastically deformable rings are compressed, and thus the race is bent. The abutment of the outer cylindrical surfaces against the housing bore centers the raceway 54 relatively to the bore 51 of the housing.

In producing the shapes of the bearings and in the selection of material for the deformable ring arranged about the wall of the race or in the groove in the raceway, the temperature conditions and working conditions of the bearing have always to be taken into consideration. It is expedient to use materials which have particularly slight compressibility, so that with slight axial deformation the greatest possible radial forces are produced, or the volume due to the axial displacement of the additional elements or parts of the rings is sufficiently great to provide an effective positive engagement between the wall of the race and the housing bore in all cases. When metals are used, it is possible to accept greater pressures, and if synthetic plastic materials are used there is the advantage of smaller deformation forces and additional damping owing to the given properties of the material.

It will be desirable to use closed non-divided rings; this can be done in the case of synthetic plastic materials, for example, by extruding about the race or by pulling such rings over the race using the ability of the plastic to expand, and in the case of metals having a low melting point this can be done by casting about the race, with adequate dissipation of heat in order to avoid reducing the hardness of the raceway. In the case of materials having relatively high strength, or for manufacturing reasons, when conditions permit, rings of the aforesaid material divided in the peripheral direction can be inserted in the aforesaid recesses on the race wall.

The procedure is similar in the case of an inner race as it is in the case of an outer race, the measures described hereinbefore widening the raceway diameter in this case and thus narrowing the clearance.

A cambered raceway is achieved by the construction of the cross-section as shown for example in FIGURES 4 and 7, as a relatively considerable bending occurs together with construction of the diameter in the middle of the recesses.

We claim:

1. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including a ring of deformable material located between said race and the other of said members, and annular elements also located between said race and said other of said members, said annular elements being disposed on axially opposite sides of said deformable ring and displaceable axially relatively to one another to produce, by axial compression of said ring, radial expansion thereof and consequent adjustment of said raceway and bearing clearance.

2. The combination claimed in claim 1, wherein the deformable material of said ring is also elastic, and said roller elements being elongated and contacting peripherally the inner annular wall of the raceway and the periphery of one of said members to an extent axially substantially the same as the axial extent of said deformable material.

3. The combination claimed in claim 1, wherein said deformable ring is of multi-part construction in the axial sense.

4. The combination claimed in claim 1, wherein said deformable ring is of multi-part construction in the peripheral direction.

5. In combination, a bearing housing having a bearing-receiving opening formed therein, said opening being defined by a smooth cylindrical wall extending along the entire axial length of said opening; a bearing located in said opening, said bearing including an outer race having on its radially inner side an annular raceway, and including a circular series of roller elements arranged for rolling engagement with said raceway; a shaft extending axially through said circular series of roller elements; and means for adjusting the diameter of said raceway and the bearing clearance, said means including a ring of deformable material located between the race and said smooth cylindrical wall, and annular elements formed separately from said housing, said elements being located on opposite axial sides of said ring and being displaceable axially relatively to one another to produce, by axial compression of said ring, radial expansion thereof and consequent adjustment of said raceway and bearing clearance.

6. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including a ring of deformable material located between said race and the other of said members, and two rigid rings located on opposite axial sides of said ring of deformable material and between said race and said other of said member, said rigid rings being displaceable axially one relatively to the other to produce, by axial compression of said ring of deformable material, radial expansion thereof and consequent adjustment of said raceway and said bearing clearance.

7. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including a ring of deformable material located between said race and the other of said members, an annular rim integral with said race and directed generally radially towards said other of said members to one axial side of said ring of deformable material, and a rigid ring located to the other axial side of said ring of deformable material between said race and said other of said members, said rigid ring being axially displaceable relatively to said rim to produce, by axial compression of said ring of deformable material, radial expansion thereof for the adjustment of said raceway and bearing clearance.

8. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including two axially spaced annular elements integral with said race and directed generally radially towards the other of said members, a ring of deformable material confined axially between said elements and radially between said race and said other of said members, and means mounted on said other of said members for axially displacing one of said elements towards the other of said elements to produce, by axial compression of said ring of deformable material between said elements, radial expansion of said ring and consequent adjustment of said raceway and bearing clearance.

9. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including a plurality of annular projections integral with said race directed generally radially towards the other of said members and axially spaced from one another along the axial length of said race to define therebetween a plurality of grooves, a plurality of rings of deformable material, one of said rings being provided in each of said plurality of annular grooves, and means mounted on said other of said members for pressing said plurality of annular projections towards one another to produce, by axial compression of said plurality of rings, radial expansion thereof and consequent adjustment of said raceway and bearing clearance.

10. In combination, two relatively rotatable members; a bearing concentrically arranged between said members, said bearing including a race having an annular raceway, and including a series of roller elements disposed between said raceway and one of said members; and means for adjusting the diameter of said raceway and the bearing clearance, said means including a plurality of annular projections integral with said race directed generally radially towards the other of said members and axially spaced from one another along the axial length of said race to define therebetween a plurality of annular recesses, a plurality of axially spaced annular grooves formed in said raceway and axially offset in relation to said plurality of annular recesses, a plurality of rings of deformable material, one of said rings being disposed in each of said annular recesses, and means mounted on said other of said members for pressing said plurality of annular projections towards one another to produce, by axial compression of said plurality of rings, radial expansion thereof and consequent adjustment of said raceway and bearing clearance.

References Cited in the file of this patent

UNITED STATES PATENTS

| | | |
|---|---|---|
| 1,851,561 | Baninger | Mar. 29, 1932 |
| 2,473,267 | Wightman | June 14, 1949 |
| 2,865,689 | Anderson | Dec. 23, 1958 |

OTHER REFERENCES

Germany, S 39342 XII/47b, Dec. 27, 1956.